US011782838B2

(12) United States Patent
Acharya et al.

(10) Patent No.: US 11,782,838 B2
(45) Date of Patent: Oct. 10, 2023

(54) COMMAND PROCESSOR PREFETCH TECHNIQUES

(71) Applicant: Advanced Micro Devices, Inc., Santa Clara, CA (US)

(72) Inventors: Anirudh R. Acharya, San Diego, CA (US); Alexander Fuad Ashkar, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 39 days.

(21) Appl. No.: 17/219,769

(22) Filed: Mar. 31, 2021

(65) Prior Publication Data

US 2022/0050781 A1 Feb. 17, 2022

Related U.S. Application Data

(60) Provisional application No. 63/065,985, filed on Aug. 14, 2020.

(51) Int. Cl.
| | | |
|---|---|---|
| *G06F 12/08* | (2016.01) | |
| *G06F 12/0862* | (2016.01) | |
| *G06F 12/10* | (2016.01) | |
| *G06F 12/0875* | (2016.01) | |

(52) U.S. Cl.
CPC ...... *G06F 12/0862* (2013.01); *G06F 12/0875* (2013.01); *G06F 12/10* (2013.01); *G06F 2212/6024* (2013.01)

(58) Field of Classification Search
CPC ... G06F 12/0862; G06F 12/0875; G06F 12/10
See application file for complete search history.

(56) References Cited

U.S. PATENT DOCUMENTS

| | | | |
|---|---|---|---|
| 5,774,684 A | 6/1998 | Haines et al. | |
| 9,110,810 B2 | 8/2015 | Wang et al. | |
| 10,043,235 B2 | 8/2018 | Kim et al. | |
| 10,121,220 B2 | 11/2018 | Bolz | |
| 10,198,849 B1 | 2/2019 | Ashkar et al. | |
| 2002/0062434 A1* | 5/2002 | Chauvel | G06F 12/1036 711/138 |
| 2005/0055511 A1* | 3/2005 | Schreter | G06F 12/123 711/134 |
| 2007/0260446 A1 | 11/2007 | Suba et al. | |
| 2007/0285287 A1 | 12/2007 | Hussain et al. | |

* cited by examiner

*Primary Examiner* — Jae U Yu
(74) *Attorney, Agent, or Firm* — Volpe Koenig

(57) ABSTRACT

Techniques for prefetching are provided. The techniques include receiving a first prefetch command; in response to determining that a history buffer indicates that first information associated with the first prefetch command has not already been prefetched, prefetching the first information into a memory; receiving a second prefetch command; and in response to determining that the history buffer indicates that second information associated with the second prefetch command has already been prefetched, avoiding prefetching the second information into the memory.

20 Claims, 5 Drawing Sheets

COMMAND PROCESSOR PREFETCH TECHNIQUES

CROSS REFERENCE TO RELATED APPLICATION

This application claims the benefit of U.S. Provisional application No. 63/065,985, entitled "COMMAND PROCESSOR PREFETCH TECHNIQUES," filed on Aug. 14, 2020, which is incorporated by reference as if fully set forth herein.

BACKGROUND

Cache memory is typically loaded with information after a request for the information fails to find the information in the cache (i.e., "misses the cache'). This extra step of looking for the information in the cache and then loading it into the cache when it is not found can be avoided in some cases by "prefetching" the information into the cache; i.e., loading the information into the cache before it is requested. Prefetching is typically possible where the request for the information is known or predicted in advance.

BRIEF DESCRIPTION OF THE DRAWINGS

A more detailed understanding can be had from the following description, given by way of example in conjunction with the accompanying drawings wherein.

DETAILED DESCRIPTION

Techniques for prefetching are provided. The techniques include receiving a first prefetch command; in response to determining that a history buffer indicates that first information associated with the first prefetch command has not already been prefetched, prefetching the first information into a memory; receiving a second prefetch command; and in response to determining that the history buffer indicates that second information associated with the second prefetch command has already been prefetched, avoiding prefetching the second information into the memory.

Figure 1:
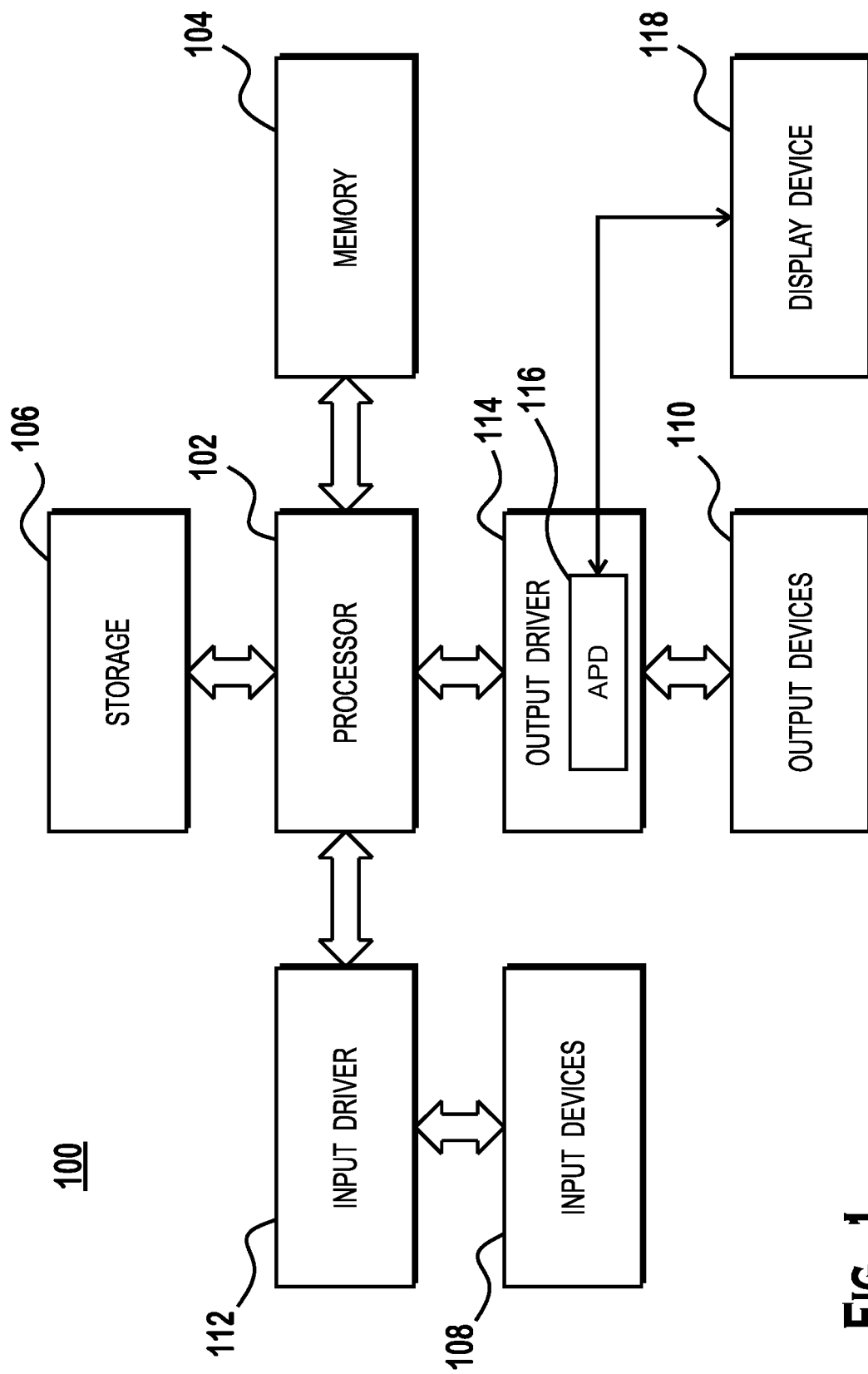
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
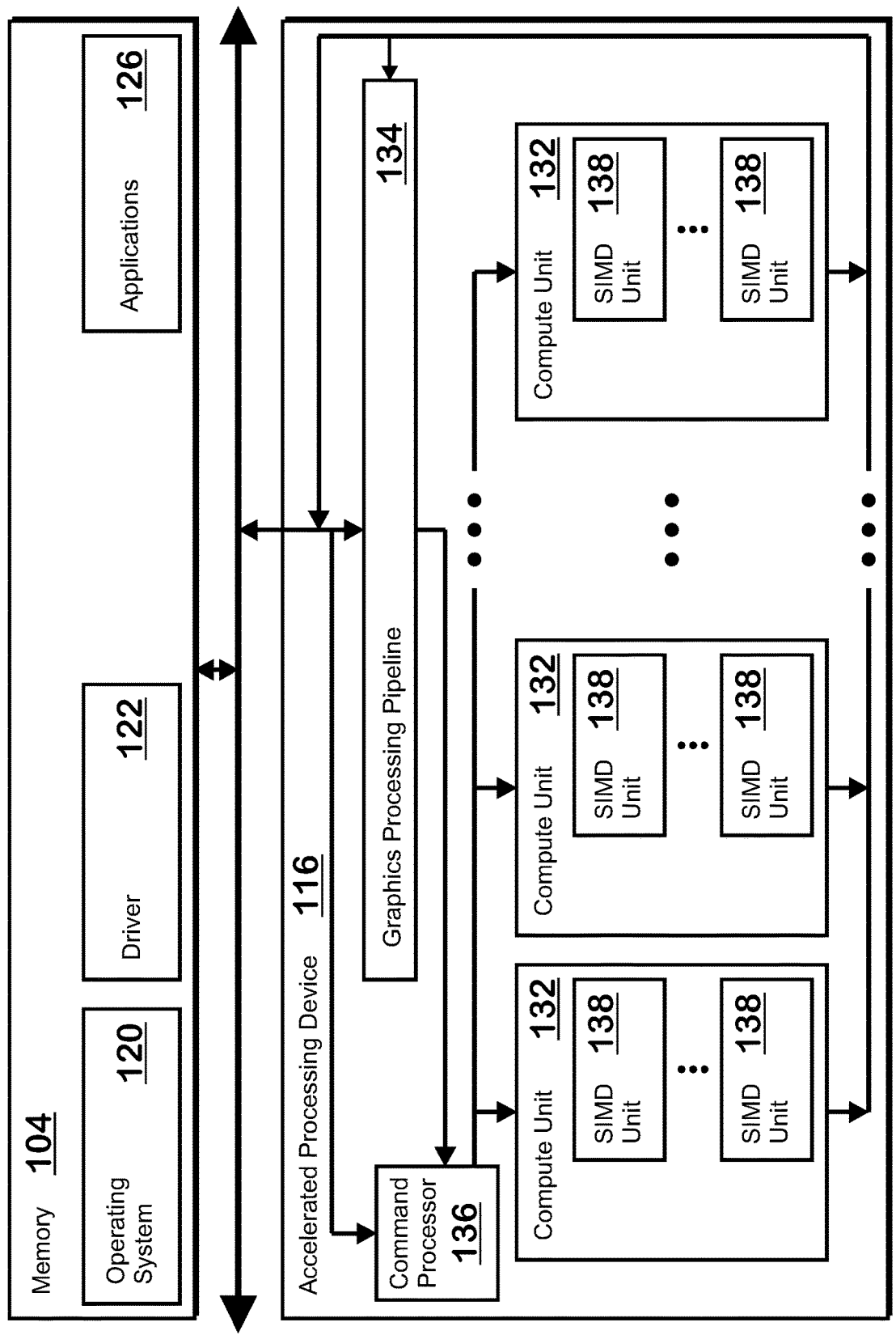
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A command processor 136 performs operations related to scheduling various workgroups on different compute units 132 and SIMD units 138. In general, the command processor 136 receives commands from an entity such as the processor 102, where the commands instruct the APD 116 to perform tasks such as graphics rendering, executing general purpose shaders, or the like.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
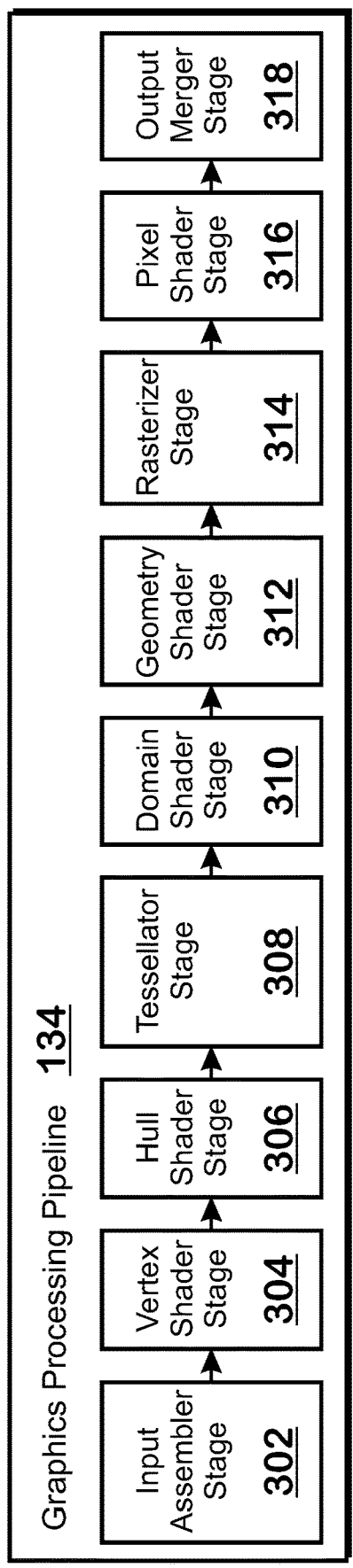
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

The system 100 includes a number of memories, such as caches or memories within the APD 116. One example of such memory includes a cache that stores, among other things, instructions for one or more shader programs executed in the compute units 132. In addition, the system 100 includes one or more caches that cache virtual-to-physical address translations (for example, translation lookaside buffers). In some examples, in addition to addresses and instructions, these caches store data for other purposes.

During rendering, the processor 102 sends commands to the APD 116 to render geometry, and specifies shader programs used for such rendering. For example, for a first set of geometry, the processor 102 specifies specific shader programs to execute for various stages of the graphics processing pipeline 134 such as the vertex shader stage 304 and the pixel shader stage 316, and for a second set of geometry, the processor 102 specifies a different set of shader programs to execute for those stages of the graphics processing pipeline 134.

To prevent work from waiting for shader programs or other data to be read into cache memory of the APD 116, a prefetcher prefetches shader programs into cache memory in response to the APD 116 (e.g., the command processor 136) identifying that some incoming or pending rendering will use those shader programs. However, it is possible for multiple sets of rendering work to use the same shader programs. Thus it could be possible for the APD 116 to prefetch the same shader programs multiple times. Such repeated prefetching provides no benefit, since the required data or instructions are already in the cache, but results in a substantial amount of cache traffic. Thus techniques are provided herein for reducing repeated prefetching of the same information into one or more memories of the APD 116.

Figure 4:
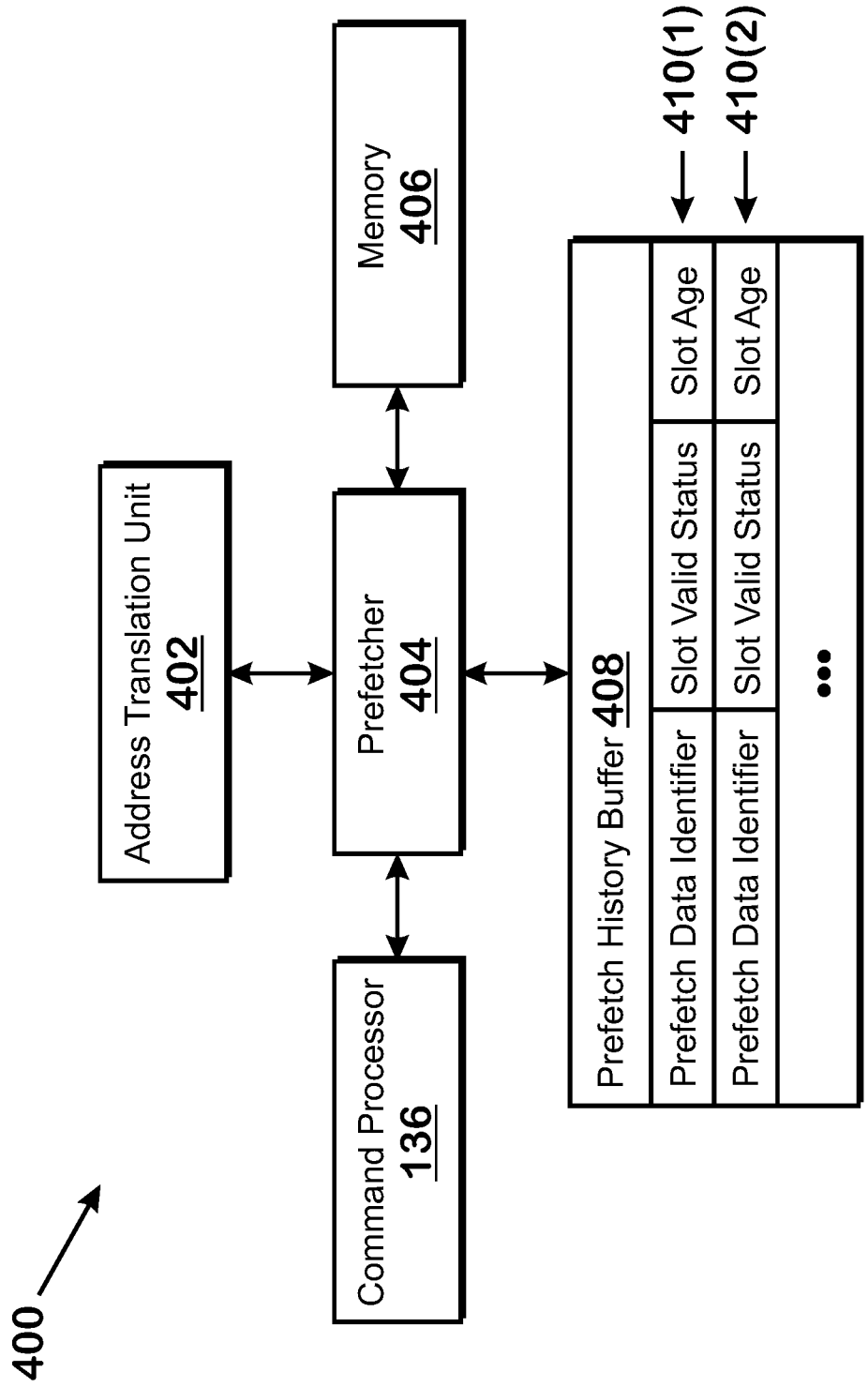
FIG. 4 is a block diagram of a prefetch system for prefetching information into the APD while avoiding redundant prefetching, according to an example.

FIG. 4 is a block diagram of a prefetch system 400 for prefetching information into the APD 116 while avoiding redundant prefetching, according to an example. The system includes a command processor 136, an address translation unit 402, a prefetcher 404, a memory 406, and a prefetch history buffer 408. In various examples, any of these units are implemented as software executing on a processor (such as the command processor 136), hard-wired circuitry (such as a programmable processor or fixed function circuitry), or a combination of software and hard-wired circuitry.

The command processor 136 receives instructions from the processor 102, such as instructions to perform graphics rendering, or explicit instructions to prefetch information. Some such instructions to perform graphics rendering require access to information such as shader programs. For either instructions or the explicit instructions to prefetch information, the command processor 136 informs the prefetcher 404 that a prefetch operation is required for information to be prefetched. In response, the prefetcher 404 examines the prefetch history buffer 408 to determine whether to actually perform a prefetch for the information to be prefetched. If the prefetch history buffer 408 indicates that the information is already in the memory 406, then the prefetcher 404 does not prefetch the information. If the prefetch history buffer 408 does not indicate that the information is already in the memory 406, then the prefetcher 404 does prefetch the information.

In some examples, the prefetcher 404 prefetches the information in the following manner. The prefetcher 404 reads the information from a source, such as the memory 104 of the device 100. Reading the information results in that information being placed into a cache memory, which is, in some implementations, the memory 406. In addition, in some implementations, this read results in virtual-to-physical address translations being placed into a cache (such as a translation lookaside buffer) of the address translation unit 402. More specifically, in general, in response to accesses to memory being performed by virtual address, the address translation unit 402 obtains virtual-to-physical address translations for those accesses. If those translations are not already stored within a cache memory such as a translation lookaside buffer, then the address translation unit 402 places those translations into the cache memory so that the same translation is accessible with much lower latency in the near future.

In some examples, the prefetch history buffer 408 is implemented in the following manner. The prefetch history buffer 408 includes a plurality of prefetch history buffer slots 410 (also referred to as "entries"). Each prefetch history buffer slot 410 includes a prefetch data identifier, a slot valid status, and a slot age. The prefetch data identifier indicates which portion of memory (such as which portion of a memory address space) the entry 410 is associated with. In other words, the identifier indicates which portion of memory is indicated as having already been prefetched. The slot valid status indicates whether the entry 410 is valid. An entry 410 that is valid includes valid information regarding what information has already been prefetched. An entry 410 that is not valid includes invalid information. The prefetcher 404 is permitted to consider valid entries 410, but not invalid entries 410, in making the determination regarding whether information has already been prefetched.

The slot age is used by the prefetcher 404 for an eviction algorithm. In an example, in the event that the prefetch history buffer 408 is full (there are no slots 410 that are invalid) and a new entry 410 is to be placed into the prefetch history buffer 408, the prefetcher 404 evicts at least one of the entries 410. If a least-recently-used replacement algorithm is used, then the prefetcher 404 selects the oldest entry 410, identified by the age slot, to remove from the prefetch history buffer 408.

In some examples, the prefetcher 404 manages the prefetch history buffer 408 in the following manner. The prefetcher 404 receives instructions indicating that prefetching is required for certain information. In response, the prefetcher 404 checks the prefetch history buffer 408 to determine whether the prefetch history buffer 408 includes an entry 410 indicating that the information has already been prefetched. If the prefetch history buffer 408 includes such an entry 410, then the prefetcher 404 does not modify that entry 410 and also does not prefetch the information. If the prefetch history buffer 408 does not include such an entry 410, then the prefetcher 404 includes such an entry 410 into the prefetcher and does prefetch the information. The added entry 410 includes a valid status indicating the entry 410 is valid, an age indicating the age of this entry, and an identifier indicating the portion of memory (e.g., the portion of a virtual address space managed by an operating system executing on the processor 102). As described elsewhere herein, a request for prefetch can be explicitly made by the processor 102, or a request may be implicit. In some examples, an implicit request to prefetch information is an explicit request to perform work that requires the information. In an example, the processor 102 sends a request to render geometry (e.g., a draw call) that specifies or is associated with a particular graphics processing pipeline 134 configuration that specifies one or more shader programs to execute at one or more stages. In response to this request, the command processor 136 determines the memory addresses of the shader programs required and transmits a request to prefetch those shader programs into the memory 406.

Although the prefetch history buffer 408 is described as including certain information, such as the valid status and the age, the present disclosure contemplates implementations that do not include all information illustrated and described herein.

It is possible for a single prefetch request to specify some information for which an entry 410 in the prefetch history buffer 408 indicates that some of the information has already been prefetched and some of the information has not already been prefetched. In that instance, the prefetcher 404 prefetches the information indicated as not yet being prefetched and updates the prefetch history buffer 408 to indicate that all such information has already been prefetched. The prefetcher 404 does not prefetch the information indicated as already having been prefetched.

In some examples, at least a portion of the prefetcher 404 is embodied as a direct memory access ("DMA") engine that is coupled to one or more memories external to the APD 116. In examples, the DMA engine is capable of reading from the external memory. In some examples, the DMA engine performs the prefetching by reading data from the external memory and not writing the data into any memory internal to the APD 116 explicitly, although the data is still written into a cache of the APD 116. In other words, the DMA engine reads from the external memory, but does not store the read data at any memory address internal to the APD. However, the act of reading, even without writing to an internal memory address, still stores the data into one or more caches of the APD, and loads translations into translation caches (e.g., a TLB).

Although illustrated as separate boxes in in some examples, in some examples, the command processor 136 and prefetcher 404 are the same unit, or the prefetcher 404 is included within the command processor 136. For example, in some implementations, the operations of the prefetcher 404 are performed by the command processor 136.

In some examples, the command processor 136 or other entity invalidates some or all of the contents of the memory 406. In response to the contents of the memory 406 being invalidated, the prefetcher 404 invalidates the entries 410 of the prefetch history buffer 408 corresponding to the contents of the memory 406 that are invalidated.

In some examples, the memory 406 is a cache, such as a level 2 cache, and the prefetch history buffer 408 stores entries 410 for any of the data of the entire level 2 cache. In such examples, in response to an entity invalidating the level 2 cache as a whole, the prefetcher 404 invalidates all entries 410 of the prefetch history buffer 408. In other examples, an entity invalidates portions of the memory 406, and the prefetcher 404 invalidates the portions of the prefetch history buffer 408 that corresponds to the invalidated portions of the memory 406.

Although various aspects of the prefetch system 400 have been described, it should be understood that many alternatives are contemplated by the present disclosure. In an example, the prefetching performed by the prefetcher 404 occurs to any memory and not just a level 2 cache. In an example, the address translations that are prefetched occurs to any memory, and not just a TLB. In other examples, the prefetching techniques described herein are performed by or in a system other than the APD 116 or system 100 described herein. In various examples, processors involved in the prefetching include programmable processors, application specific integrated circuits, or other processors. In various examples, any information is prefetched into the memory 406. For example, although shader program instructions are sometimes described herein as being prefetched into the memory 406, information other than shader program instructions are alternatively or additionally prefetched into the memory 406.

Although only one prefetch history buffer 408 is illustrated, in some examples, the system 400 includes multiple prefetch buffers that store prefetch history entries 410 for different aspects of the system 100. In an example, separate prefetch history buffers are kept for the memory 406 and the address translation unit 402. In such a situation, the prefetcher 404 prevents data and translations from being prefetched into the memory 406 and the address translation unit 402, respectively, based on the contents of the individual prefetch history buffers, as described elsewhere herein. Additionally, in such a situation, the prefetcher 404 maintains the individual prefetch history buffers individually. For example, the prefetcher 404 adds entries to the prefetch history buffer for a memory 406 in response to data being fetched into that memory, invalidates such entries when the memory 406 is invalidated, adds entries to the prefetch history buffer for an address translation unit in response to translations being fetched into the address translation unit, and invalidates such entries when the translations in the address translation unit are invalidated.

In some implementations, override functionality is provided, whereby the a prefetch command received from an entity such as the processor 102 includes information which forces the prefetch of information regardless of whether or not the prefetch history buffer 408 indicates that the information has already been prefetched. In some implementations, the history buffer is implemented as a content addressable memory (CAM). Examples of usage of the override functionality include where the shader is very data intensive, causing frequent eviction of the data cache, resulting in prefetched shaders being evicted before the shaders are properly used.

Figure 5:
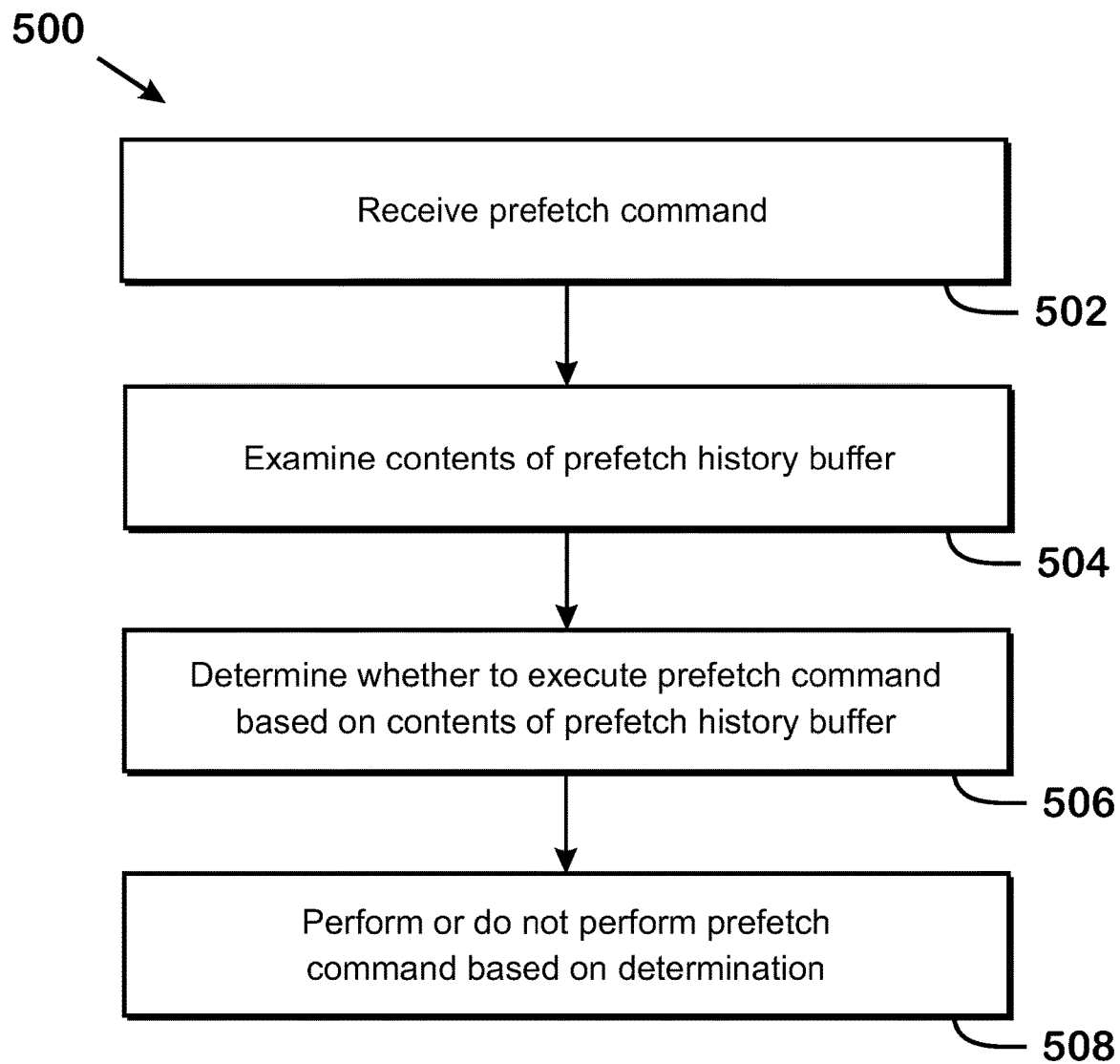
FIG. 5 is a flow diagram of a method for prefetching information, according to an example.

FIG. 5 is a flow diagram of a method 500 for prefetching information, according to an example. Although described with respect to the system of FIGS. 1-4, it should be understood that any system, configured to perform the steps of the method 500 in any technically feasible order, falls within the scope of the present disclosure.

At step 502, the prefetcher 404 receives a prefetch command. As described elsewhere herein, in some examples, the prefetch command is generated explicitly by a client such as the processor 102 or another processor. In other examples, the prefetch command is generated by the prefetcher 404 itself or by the command processor 136 in response to activity that indicates that prefetching should occur. In an example, such activity is requesting, by a client such as the processor 102, that certain geometry is rendered. Note that such a request by an entity such as the processor 102 is not necessarily an immediate access to information that is to be prefetched, such as shader program instructions. In an example, in response to receiving a request to perform certain rendering for certain input data, the command processor 136 instructs the graphics processing pipeline 134 to render the input data with a pipeline configuration including certain shader programs for certain pipeline stages. In response to the request to perform rendering, the prefetcher 404 prefetches information for the rendering, including the shader program instructions, before information for the rendering arrives at the stages of the graphics processing pipeline 134 for which the shader program instructions are prefetched. Note that in some instances, the prefetching occurs even before the graphics work has been scheduled for processing through the graphics processing pipeline 134. For instance, it is possible for the graphics work to reside in a waiting queue or buffer prior to actually being scheduled for processing through the graphics processing pipeline 134. It should be understood that the term "prefetching" does not refer to the loading that occurs in response to rendering work directly triggering execution of a shader program, but instead refers to pre-loading of information before the graphics processing pipeline 134 actually needs that information.

At step 504, in response to the prefetch command, the prefetcher 404 examines the contents of a prefetch history buffer 408 to determine whether to actually execute the prefetch command. The prefetch history buffer 408 indicates whether or not particular information has previously been prefetched. In an example, the prefetch history buffer 408 includes entries 410 as described in FIG. 4. In other examples, the prefetch history buffer 408 includes other information.

At step 506, the prefetcher 404 determines whether to perform prefetching for the prefetch command based on the contents of the prefetch history buffer 408. In an example, if the prefetch history buffer 408 indicates that information has been prefetched, the prefetcher 404 does not prefetch the information and if the prefetch history buffer 408 indicates that the information has not been prefetched, the prefetcher 404 does prefetch the information. At step 508, the prefetcher 404 performs or does not perform the prefetch command based on step 506 (for example, the prefetcher 404 prefetches information in the event that the prefetcher determines that such information should be prefetched and does not prefetch information in the event that the prefetcher determines that such information should be prefetched).

In addition to the operations illustrated in FIG. 5, the prefetcher 404 also manages the prefetch history buffer 408. Specifically, the prefetcher 404 adds entries corresponding to information upon prefetching that information and removes entries when an eviction occurs (e.g., when the prefetch history buffer 408 is full). In addition, in some examples, the prefetcher 404 invalidates the prefetch history buffer 408 in response to the memory 406 into which the data is being prefetched. In addition, in some instances, the entity that issues an instruction to prefetch includes an override indication. In this situation, the prefetcher 404 prefetches the requested information regardless of the contents of the prefetch history buffer 408.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the command processor 136, the graphics processing pipeline 134, the compute units 132, the SIMD units 138, the system 400, the address translation unit 402, the prefetcher 404, the memory 406, or the prefetch history buffer 408 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for prefetching, the method comprising:
receiving a first prefetch command;
in response to determining that a prefetch history buffer indicates that first information associated with the first prefetch command has not already been prefetched, prefetching the first information into a memory;
receiving a second prefetch command;
in response to determining that the history buffer indicates that second information associated with the second prefetch command has already been prefetched, avoiding prefetching the second information into the memory;
receiving a third prefetch command that specifies third information and includes an override indication; and prefetching the third information into the memory despite the prefetch history buffer indicating that the third information has already been prefetched.

2. The method of claim 1, further comprising invalidating the history buffer in response to the memory being invalidated.

3. The method of claim 1, wherein the first prefetch command is implicit or explicit.

4. The method of claim 1, wherein prefetching information into the memory occurs before the information is requested to be accessed by an entity that consumes the information.

5. The method of claim 1, wherein the memory is a cache that stores shader program instructions for an accelerated processing device.

6. The method of claim 1, wherein the prefetch history buffer includes a plurality of entries, each of which specifies one or more addresses.

7. The method of claim 1, further comprising:
prefetching address translations associated with the first information into an address translation cache.

8. The method of claim 7, wherein prefetching the address translations occurs in response to determining that an address translation prefetch history buffer indicates that the address translations have not yet been prefetched into the address translation cache.

9. A system comprising:
a memory; and
a prefetcher configured to:
receive a first prefetch command;
in response to determining that a prefetch history buffer indicates that first information associated with the first prefetch command has not already been prefetched, prefetch the first information into a memory;
receive a second prefetch command;
in response to determining that the history buffer indicates that second information associated with the second prefetch command has already been prefetched, avoid prefetching the second information into the memory;
receiving a third prefetch command that specifies third information and includes an override indication; and
prefetching the third information into the memory despite the prefetch history buffer indicating that the third information has already been prefetched.

10. The system of claim 9, wherein the prefetcher is further configured to invalidate the history buffer in response to the memory being invalidated.

11. The system of claim 9, wherein the first prefetch command is implicit or explicit.

12. The system of claim 9, wherein prefetching information into the memory occurs before the information is requested to be accessed by an entity that consumes the information.

13. The system of claim 9, wherein the memory is a cache configured to store shader program instructions for an accelerated processing device.

14. The system of claim 9, wherein the prefetch history buffer includes a plurality of entries, each of which specifies one or more addresses.

15. The system of claim 9, wherein the prefetcher is further configured to:
prefetch address translations associated with the first information into an address translation cache.

16. The system of claim 15, wherein prefetching the address translations occurs in response to determining that an address translation prefetch history buffer indicates that the address translations have not yet been prefetched into the address translation cache.

17. An accelerated processing device, comprising:
a compute unit configured to execute shader programs;
a memory; and
a prefetcher configured to:
receive a first prefetch command;
in response to determining that a prefetch history buffer indicates that first information associated with the first prefetch command has not already been prefetched, prefetch the first information into a memory;
receive a second prefetch command;
in response to determining that the prefetch history buffer indicates that second information associated with the second prefetch command has already been prefetched, avoid prefetching the second information into the memory,
receiving a third prefetch command that specifies third information and includes an override indication; and
prefetching the third information into the memory despite the prefetch history buffer indicating that the third information has already been prefetched,
wherein the first information includes at least one portion of a shader program for execution by the compute unit.

18. The accelerated processing device of claim 17, wherein the prefetcher is further configured to invalidate the history buffer in response to the memory being invalidated.

19. The accelerated processing device of claim 17, wherein the first prefetch command is implicit or explicit.

20. The accelerated processing device of claim 17, wherein prefetching information into the memory occurs before the information is requested to be accessed by an entity that consumes the information.

* * * * *